Nov. 9, 1965     A. L. STOWELL     3,216,117
COILABLE RULE
Filed April 3, 1963
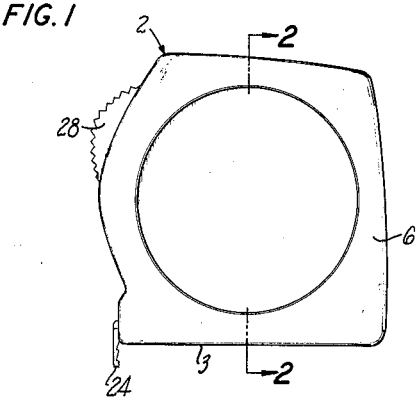
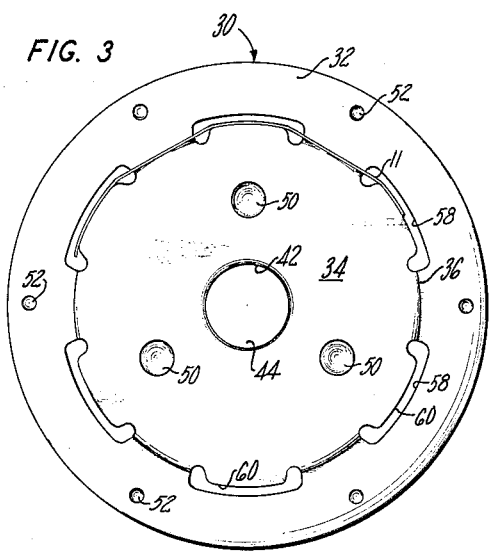
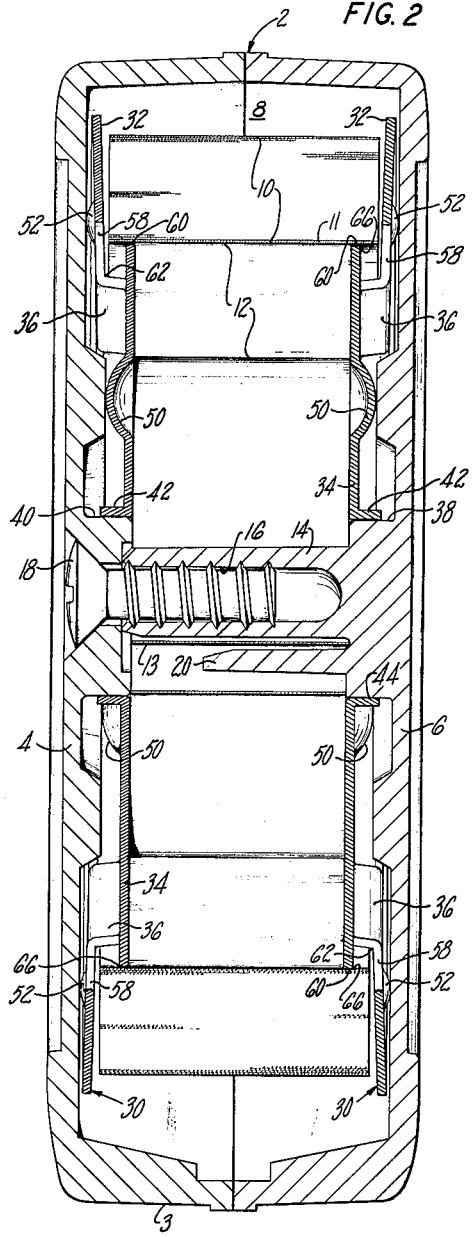
INVENTOR.
AUSTIN L. STOWELL
BY *Lindsey, Prutzman and Hays*
ATTORNEYS United States Patent Office 3,216,117
Patented Nov. 9, 1965

3,216,117
COILABLE RULE
Austin L. Stowell, New Britain, Conn., assignor to The Stanley Works, New Britain, Conn., a corporation of Connecticut
Filed Apr. 3, 1963, Ser. No. 270,226
7 Claims. (Cl. 33—138)

This invention generally relates to measuring devices which utilize a measuring tape and more particularly to an improved coilable rule incorporating a unique winding spool which facilitates the coiling and uncoiling of the measuring tape.

One of the objects of the present invention is to provide an improved coilable rule wherein the measuring tape will uncoil in an extremely free, smooth and even manner despite constructional imperfections such as cambers or the like which might inherently exist in the measuring tape. Included in this object is the provision of such a coilable rule wherein frictional forces between relatively movable parts are minimized and controlled so as to improve the coiling action of the measuring tape.

A further object of the present invention is to provide an improved coilable rule incorporating a novel guide and bearing means for the measuring tape and its associated winding spring which provides a uniform and predetermined minimum frictional force opposing the coiling of the measuring tape while further serving as a spool for uniquely storing the measuring tape in coiled position.

A still further object of the present invention is to provide such an improved coilable rule that will obtain the above objects while having a compact and durable construction which may be economically manufactured with the inclusion of standard measuring tapes as well as winding springs therefor, and which will operate effectively over long periods of repeated and rugged use.

Other objects will be in part obvious and in part pointed out more in detail hereinafter.

The invention accordingly consists in the features of construction, combination of elements and arrangement of parts which will be exemplified in the construction hereafter set forth and scope of the application which will be indicated in the appended claims.

In the drawing:

FIG. 1 is a side elevational view of a coilable rule constructed in accordance with the present invention;

FIG. 2 is an enlarged cross-sectional view taken generally along lines 2—2 of FIG. 1; and FIG. 3 is a plan view of one of the parts included in the coilable rule shown with a fragment of the measuring tape.

Referring to the drawings in detail, FIGS. 1 and 2 illustrate a coilable rule embodying the present invention comprising a casing generally designated 2, including a pair of spaced-apart side walls 4, 6, defining a chamber 8 dimensioned to receive a coilable measuring tape 10 and a coil spring 12 for winding the measuring tape into coiled position in the chamber 8 of the casing 2 as shown in FIG. 2. The casing 2 is provided with a mouth (not shown) adjacent the bottom wall 3 thereof through which the measuring tape 10 passes when the latter is extended and retracted.

In the preferred embodiment, the side walls 4, 6 of the casing 2 are secured together by means of a center post 14 projecting from the side wall 6 and provided with a threaded bore 16 for receiving an assembly screw 18 extending through the other side wall 4. The length of the center post 14 is dimensioned so as to space the side walls 4, 6 a predetermined distance apart from each other to permit the coil spring 12 to be coiled around the center post 14 as shown in FIG. 2. The inner end 13 of the coil spring 12 is anchored at the center post 14 by any suitable means which, in the shown embodiment, includes the finger 20 projecting from the side wall 6 towards the side wall 4 in spaced relationship with the center post 14 so as to receive therebetween the end 13 of the coil spring 12.

In the illustrated embodiment the measuring tape 10 has a concavo-convex body formed from a suitable material such as steel and having an inherent tendency to assume an elongated position. The body of the measuring tape 10 is provided with a protective covering so as to reduce friction and to protect the rule, as well as for a purpose to be subsequently described in greater detail.

The inner end of the measuring tape 10 is suitably connected to the coil spring 12 such as by a tongue and slot connection (not shown), so as to be automatically driven into coiled position in the chamber 8 by the coil spring 12 when the measuring tape 10 is released from any of its extended positions. The opposite end of the measuring tape 10 is provided with a suitable hook 24 shown in FIG. 1.

If desired, a suitable locking mechanism may be provided for retaining the measuring tape 10 in any of its extended positions. In the illustrated embodiment there is provided for this purpose, a novel locking mechanism generally designated 28 forming the subject matter of a copending United States application Serial No. 269,372, filed April 1, 1963 by Robert West, entitled Coilable Rule, and assigned to the assignee of the present invention.

In measuring devices of the general type described above, the coiling of the measuring tape as well as its winding spring is often impeded by the frictional forces created between the casing side walls and the measuring tape, winding spring and associated spools. The frictional engagement of the measuring tape and winding spring against the casing side walls occurs when the convolutions of the former are nonaligned or laterally displaced from a radial plane. This may be caused by several factors including camber imperfections in the metal strip employed in making the measuring tape, which imperfections are characterized by a deviation, of say ¼ inch, of the measuring tape from a straight line. Lateral displacement of the convolutions of the measuring tape may also occur when the measuring tape enters the casing at an angle thereto during rewinding of the measuring tape.

The retarding effect on the measuring tape, caused by these frictional forces, is compounded in many cases where these forces are unevenly applied or transmitted to the tape thereby creating an unbalanced condition thereon which further impairs the coiling action of the measuring tape.

In accordance with the present invention there is provided a novel guide and bearing means for the measuring tape 10 as well as the coil spring 12, which means includes a pair of identical, generally planar disclike members 30, hereinafter referred to as discs, formed from a suitable material such as cold-rolled steel, one of the discs being shown in FIG. 3. The discs 30 each include an annular outer portion 32 and a generally circular inner portion 34 offset from the outer portion 30 by stepped portions 36.

The discs 30 are mounted for rotatable movement in the chamber 8 alongside the casing side walls 4, 6 respectively, by means, which in the illustrated embodiment, includes a pair of cylindrical laterally extending bosses 38, 40 integrally formed on the casing side walls 4, 6 respectively, to receive the annular hub portions 42 which are centrally formed on the discs 30 and define a central boss-receiving aperture 44.

As shown in FIG. 2 the inner portions 34 of the discs 30 are positioned in the chamber 8 to guide the opposite edges of the spring 12 while the outer annular portions 32 of the discs 30 are positioned in the chamber 8 so as to guide the opposite edges of the measuring tape 10, the radial dimensioning of the inner and outer portions 34, 32 being sufficient to accommodate all the convolutions of the spring 12 and measuring tape 10 when the latter are in fully coiled position.

Thus, with this arrangement it will be seen that when the measuring tape 10 is being coiled the discs 30 will guide the edges of the spring 12 and measuring tape 10 into radially aligned position (as shown in FIG. 2) to prevent relative lateral shifting between the convolutions of the tape 10 and spring 12 to thereby avoid frictional engagement with the side walls 4, 6 of the casing.

In order to maintain the discs 30 at a predetermined distance away from the side walls 4, 6 of the casing 2, to thereby insure that the discs 30 will be positioned to guide the measuring tape 10 and spring 12, a plurality of dimples 50, 52 are provided on the inner portion 34 and on the outer portion 32 respectively, of the discs 30 so as to project outwardly and engage the side walls 4, 6 of the casing. The dimples 50, 52 also serve to minimize surface contact and the resulting friction between the discs 30 and the casing side walls 4, 6; and to this end the particular number of dimples 50, 52 is preselected so as to arrive at a predetermined minimum frictional amount. Additionally, the dimples 50, 52 are equiangularly spaced to further provide a uniform distribution of the frictional forces between the discs 30 and the side walls 4, 6 of the casing 2.

In accordance with another aspect of the invention, there is provided a novel means for rotating the discs 30 in unison with each other and with the measuring tape 10 as the latter is wound into coiled position so as to substantially eliminate friction between the coiled convolutions of the measuring tape 10 and the discs 30, as well as to provide a means acting as a spool for storing the measuring tape 10 when in coiled position. To this end, the discs 30 in the illustrated embodiment are formed with a plurality of equiangularly spaced elongated slots 58 positioned between the stepped portions 36 so as to provide a plurality of equiangularly spaced surfaces 60 on the periphery of the inner portion 34 of the discs 30, which surfaces 60 are positioned to act as a spool for storing the measuring tape 10 thereon as the tape 10 is wound into coiled position.

The discs 30 are formed so that the peripheral surfaces 60 thereon are slightly spaced radially outwardly from the stepped portions 36, whereby the first convolution 11 of the measuring tape 10 will assume a polygonal shape (see FIG. 3) and its edges will be spaced from, so as not to be hindered by, the curved corners 62 formed between the stepped portions 36 and the outer portions 32 of the discs 30.

When the measuring tape 10 is coiled by the spring 12, the movement of the measuring tape 10 will be transmitted to the discs 30 by means of the engagement between the edge surfaces 60 of the discs 30 and the first convolution 11 of the measuring tape 10 which engagement is enhanced by the interrupted nature of the surfaces 60 (which cause the first convolution 11 to assume a polygonal shape) and further by burrs 66 (see FIG. 2) which are formed on the outer edges of the surfaces 60, the burrs 66 biting into the protective coat of the measuring tape 10 to thereby provide additional mechanical interengagement between the discs 30 and the measuring tape 10. Thus, the discs 30 will rotate in unison together with the tape 10 to thereby greatly reduce friction between the edges of the tape 10 and the discs 30, since relative movement between the tape 10 and the discs 30 is substantially eliminated, except for a relatively slight amount occurring at those tape portions which are moving into coiled position on the discs 30.

In addition, during the coiling of the measuring tape 10, the friction between the discs 30 and the casing side walls 4, 6 is minimized to a predetermined amount and uniformly distributed by the dimples 50, 52 on the discs as described above with the result that the measuring tape 10 will return into coiled position in the casing in a quick and controlled manner without jamming or stalling.

From the above it will become readily apparent that the present invention provides an improved coilable rule wherein the friction between moving parts is controlled and minimized to not only provide a smooth and free acting tape, but further to increase the useful life of its component parts. Additionally, it will be seen that the present invention provides a unique spool means comprised of a pair of identical discs that may be easily and economically manufactured and incorporated into coilable rules.

As will be apparent to persons skilled in the art, various modifications and adaptations of the structure above described will become readily apparent without departure from the spirit and scope of the invention, the scope of which is defined in the appended claims.

I claim:

1. In a measuring device of the coilable rule type including a casing defining a chamber therein; a coilable winding spring received in the chamber and a coilable measuring tape connected to the winding spring to be wound thereby into coiled position in the chamber and adapted to be extended through the casing against the bias of the winding spring; a guide and bearing means for said measuring tape and winding spring comprising a pair of generally planar members mounted for rotatable movement in the chamber on opposite sides of the measuring tape and winding spring, said members having outer portions engageable with the edges of the measuring tape to position the convolutions thereof in interalignment and having circular inner portions engageable with the edges of the winding spring to position the convolutions thereof in interalignment, said members having stepped portions interconnecting said outer and inner portions thereof and being slotted to provide a plurality of spaced peripheral surfaces on said inner portions positioned to receive the measuring tape thereon for storage when the measuring tape is wound into coiled position.

2. In a measuring device as defined in claim 1 wherein said peripheral surfaces of the inner portions of the members are spaced radially outwardly from the stepped portions and wherein said surfaces have radially extending projections constructed to bite into the surface of the first convolution of the measuring tape whereby the members will rotate in unison with the measuring tape as the measuring tape is wound into coiled position.

3. A coilable rule comprising a casing including spaced apart side walls defining a chamber, a coilable winding spring received in the chamber between the side walls, a coilable measuring tape connected to the winding spring to be wound thereby into coiled position in the chamber between the side walls and adapted to be extended through the casing against the bias of the winding spring, a pair of disclike members mounted for rotatable movement in the chamber alongside the side walls of the casing and having a plurality of equiangularly spaced projections engaging the side walls to space the members therefrom, said members having outer annular portions engageable with the edges of the measuring tape to position the convolutions of the measuring tape in interalignment and having circular inner portions engageable with the edges of the winding spring to position the convolutions of the winding spring in interalignment, said members having stepped portions interconnecting the outer and inner portions of the members and being slotted to provide a plurality of equiangularly spaced surfaces on the periphery of said inner portions positioned to receive the measuring tape thereon for storage when the measuring tape is coiled, said surfaces on the periphery of the inner portions of the members being spaced radially outwardly from the stepped portions.

4. The coilable rule as defined in claim 3 wherein the disclike members have a central hub defining a passage and wherein the side walls of the casing are provided with laterally extending aligned bosses received in the hubs and mounting the members for rotatable movement.

5. A coilable rule comprising a casing with spaced side walls, a coilable winding spring within the casing between the side walls, a coilable measuring tape having an inner end connected to the winding spring to be wound thereby into coiled position between the side walls and extendible against the bias of the winding spring, and a spool for the measuring tape comprising a pair of spool members mounted for independent coaxial rotatable movement within the casing and in frictional engagement with the side walls respectively, said spool members having generally circular axially spaced supporting portions for supporting the measuring tape thereon as it is wound into coiled position and for receiving the winding spring therebetween, and said spool members having peripheral guide portions radially outwardly of the supporting portions axially spaced for receiving the measuring tape therebetween and engageable with the edges of the measuring tape for guiding the tape as it is wound upon the supporting portions by the winding spring.

6. A coilable rule comprising a casing with spaced side walls, a coilable winding spring within the casing between the side walls, a coilable measuring tape having an inner end connected to the outer end of the winding spring to be wound thereby into coiled position between the side walls and extendible against the bias of the winding spring, a spool support and guide for the measuring tape having a pair of spool members mounted for independent coaxial rotatable movement within the casing adjacent the side walls respectively, said spool members having axially spaced supporting portions for supporting the measuring tape thereon as it is wound into coiled position and for receiving the outer end of the winding spring therebetween, said spool members having peripheral guide portions radially and axially outwardly of the supporting portions for receiving the measuring tape therebetween and engageable with the edges of the measuring tape for guiding the tape as it is wound upon the supporting portions by the winding spring.

7. The coilable rule of claim 6 wherein the spool members have inner guide portions radially inwardly of the supporting portions and axially spaced for receiving the winding spring therebetween to position the convolutions of the winding spring into interalignment.

References Cited by the Examiner

UNITED STATES PATENTS

| | | | |
|---|---|---|---|
| 1,658,667 | 2/28 | Buttigieg | 33—138 |
| 2,014,375 | 9/35 | Carlson | 33—138 |
| 2,710,727 | 6/55 | Orowick | 242—71.9 X |

FOREIGN PATENTS

| | | |
|---|---|---|
| 592,053 | 2/60 | Canada. |

ISAAC LISANN, *Primary Examiner.*